Figure 1:
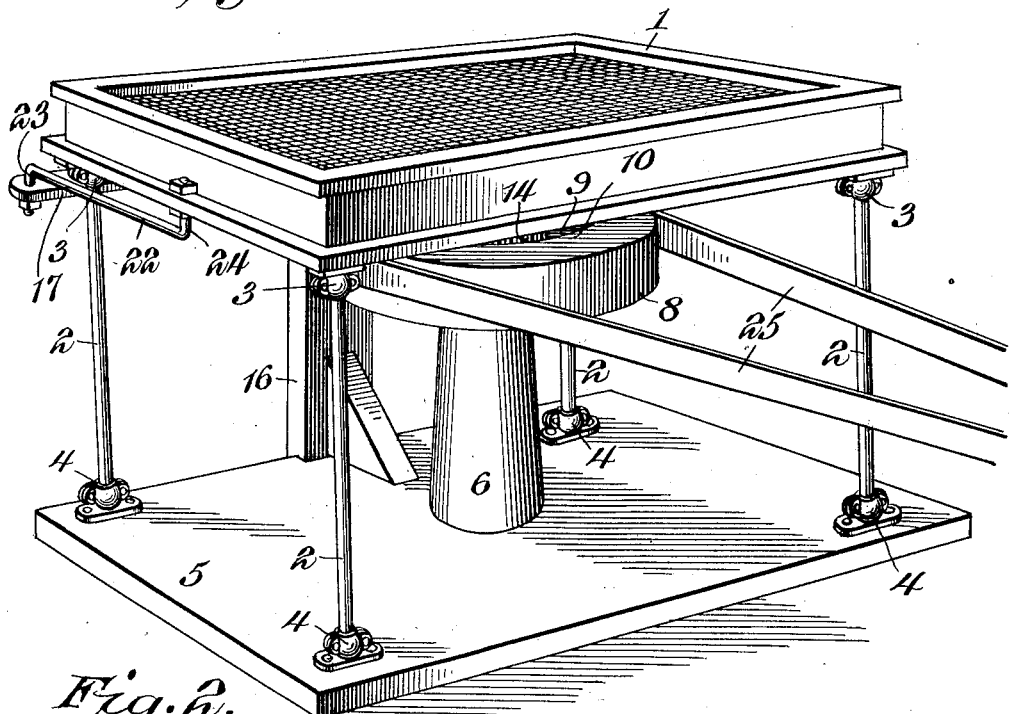

G. HALLIDAY.
SIEVE BOLTER.
APPLICATION FILED APR. 25, 1912.

1,057,053.

Patented Mar. 25, 1913.

2 SHEETS—SHEET 1.

WITNESSES
Howard D. Orr.
F. T. Chapman.

G. Halliday, INVENTOR,
BY E. G. Siggers
ATTORNEY

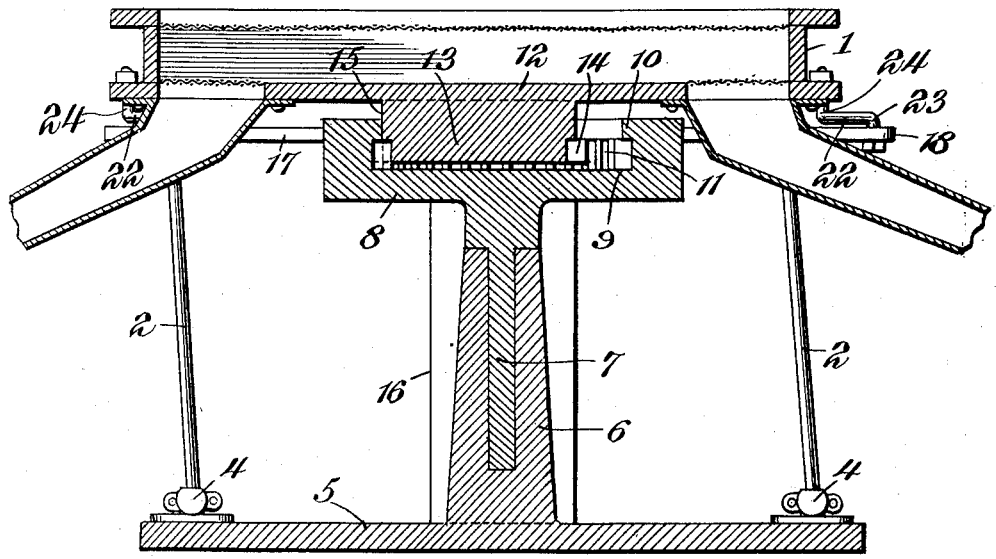
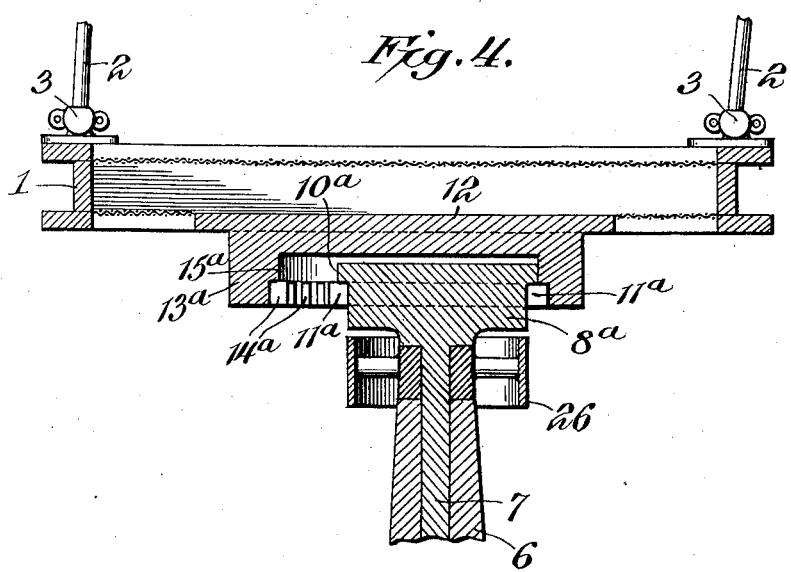

UNITED STATES PATENT OFFICE.

GEORGE HALLIDAY, OF TACOMA, WASHINGTON, ASSIGNOR OF ONE-THIRD TO CHARLES ALBERT BLACK, OF OAKLAND, CALIFORNIA, AND ONE-THIRD TO JOHN DILL ARMSTRONG, OF TACOMA, WASHINGTON.

SIEVE-BOLTER.

1,057,053. Specification of Letters Patent. Patented Mar. 25, 1913.

Application filed April 25, 1912. Serial No. 693,178.

*To all whom it may concern:*

Be it known that I, GEORGE HALLIDAY, a citizen of the United States, residing at Tacoma, in the county of Pierce and State of Washington, have invented a new and useful Sieve-Bolter, of which the following is a specification.

This invention has reference to improvements in sieve bolters, but is not confined specifically to a sieve bolter, for it may be adapted to other structures where a gyrating motion is desired.

The object of the present invention is to obtain a gyrating motion of comparatively high speed from a slow-speed drive and to eliminate liability of slip between the drive and driven members of the structure.

In accordance with the present invention the sieve or other structure to be driven is mounted for universal movement within a limited zone and a gyrating motion is imparted to the driven structure by a rotatable drive member acting in the manner to impart a comparatively high rate of gyratory movement to the driven member without any positive connection between the drive and driven members except that which is provided to prevent slip.

The invention will be best understood from a consideration of the following detailed description taken in connection with the accompanying drawings forming a part of this specification, with the further understanding that while in the drawings there are illustrated practical embodiments of the invention the showing of the drawings includes but two of the various forms which the invention may assume, wherefore the latter is not limited to any strict conformity with the illustration but may be variously changed and modified so long as such changes mark no material departure from the salient features of the invention.

Figure 2:
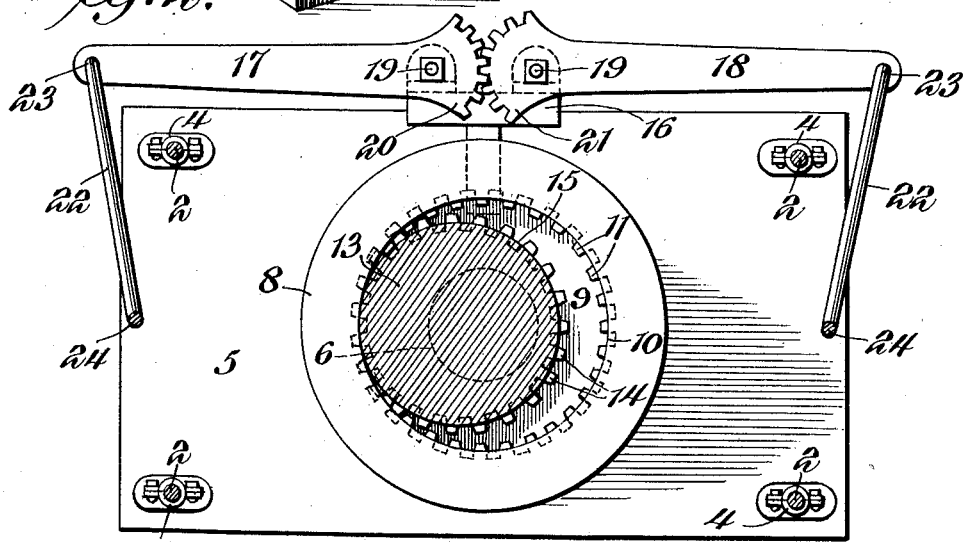

In the drawings:—Figure 1 is a perspective view of a structure embodying the present invention. Fig. 2 is a horizontal section taken immediately above the drive member and traversing a portion of the driven member and other parts. Fig. 3 is a vertical section traversing the axis of rotation of the drive member. Fig. 4 is a section similar to that of Fig. 3 and illustrating a modified form of the invention.

Referring to the drawings there is shown a sieve frame 1 which may be taken as indicative of any suitable sieve or other structure to which gyratory motion is to be imparted, and while the member to be actuated will for convenience of description be referred to as a sieve it will be understood that this term is to be taken as including any device to which the invention is applicable.

The sieve frame is shown as substantially rectangular in outline, and is mounted at the four corners upon rods 2 by means of ball and socket joints 3, 4 at the opposite ends of the rods, the universal joints 3 in the particular showing of the drawings being connected to the sieve frame, and the joints 4 being mounted upon a base 5 which may be taken as indicative of any suitable supporting means. The rods 2 are in the form shown in Figs. 1, 2 and 3 indicated as upstanding from the base 5 and supporting the sieve 1 at their upper ends. The same function may be performed by the rods if they are pendent from some overhead support and carry the sieve frame 1 at their lower ends, as indicated in Fig. 4. In either instance the sieve frame is held against bodily rotation, but may have a limited orbital movement about an axis within the borders of the frame, which movement may be described as gyratory.

Mounted on the base 5 is a post or pedestal 6 in which is mounted a stem 7 carrying at what constitutes its upper end a head 8 of suitable lateral expanse with relation to the longitudinal axis of the stem 7. That face of the head 8 remote from the stem 7 is formed with a circular recess 9 concentric with the axis of the stem 7 and about the open end of this recess there is formed an inturned circumferential flange 10 between which and the bottom of the recess there is provided a circular series of gear teeth 11, the flange 10 in part overlying the gear teeth. The sieve frame 1 is provided with a bottom member 12 which in turn carries a boss 13 having at the end remote from the sieve frame a marginal series of gear teeth 14 conforming to the gear teeth 11 to mesh therewith, and between the sieve frame and the teeth 14 the boss 13 is provided with a smooth peripheral portion 15 adapted to engage the inner face of the flange 10. The internal diameter of the flange 10 is greater than the external diameter of the periphery 15 of the boss 13.

The base 5 has erected thereon a post 16 carrying at its upper end two levers 17, 18, by means of pivots 19, about which the levers may turn. These levers project in opposite directions one with reference to the other and at their contiguous ends are expanded to form gear segments 20, 21, respectively, so related as to mesh one with the other. The adjacent ends of the levers have each attached thereto a link 22 with opposite ends 23, 24 reversely bent so that one end, the end 23, forms a pivotal connection with the corresponding end of the lever 17 or 18 as the case may be, while the other end is pivotally connected to the corresponding end of the sieve frame at about the center of said end.

Let it be assumed that the periphery of the expanded head 8 has applied thereto a belt 25 coming from some suitable source of power, and which may be taken as indicative of any means for imparting rotary motion to the head 8. This movement is transmitted by the teeth 11 to the teeth 14 and by the latter to the boss 13, and as the boss is fast to the sieve frame there is a tendency to rotate the sieve frame. This rotative impulse is, however, resisted by the rods 2, but since these rods are supported for free universal movement about their supports the boss 13 tends to travel about the inner circumference of the head 8 as defined by the recess 9, being held from falling or moving laterally beyond a certain extent by the engagement of the peripheral portion 15 of the boss 13 with the flange 10, which serves to confine and circumscribe the movement of the sieve about an axis coincident with the axis of rotation of the head 8, the sieve having a nonrotative gyratory motion of a diameter determined by the difference in diameter of the boss 13 and flange 10. The teeth 11 and 14 are so related that the teeth 14 do not enter between the teeth 11 to an extent to cause the teeth to jam and so produce undue friction, the entire strain being borne by the flange 10 where engaged by the peripheral portion 15 of the boss 13. The engagement between the flange 10 and portion 15 of the boss 13 is a rolling engagement, the boss having a revolving, nonrotative movement, while the flange 10 and head 8 have a rotative movement only, wherefore the engagement between the flange 10 and boss 13 is a rolling engagement and the friction is practically negligible.

In the structure shown in Figs. 1, 2 and 3 the drive member is the larger or inclosing member and the driven member is the smaller or inclosed member. So far as the gyratory motion is concerned the same result may be accomplished by making the drive member the inclosed member and the driven member the inclosing member. In Fig. 4 there is shown a head $8^a$ provided with a peripheral series of gear teeth $11^a$ and a marginal rim $10^a$, while attached to the sieve box 1 there is a ring-shaped boss $13^a$ having an internal series of inwardly directed gear teeth $14^a$ and an internal ledge $15^a$ in position to be engaged by the flange $10^a$ of the head $8^a$. The head $8^a$ is driven by a suitable belt applied to a pulley 26. It will be understood, of course, that the levers 17 and 18 and connecting parts are applied to the sieve shown in Fig. 4 in the same manner as shown in the structure of Figs. 1, 2 and 3, wherefore the illustration of these parts with reference to Fig. 4 has been omitted. The action of the structure shown in Fig. 4 is the same as that shown in the other figures, for when the drive member is rotated about its axis the driven member $13^a$ and parts carried thereby revolve about the same axis through an orbit determined by the difference in diameter of the drive and driven members where engaging, and the extent of gyration of the driven member is determined by such difference in diameter.

In practice it is found that the driven member will make several gyratory movements or complete revolutions about its axis while the drive member is making one rotation about the same axis, so that with a comparatively slow movement of the drive member the driven member is rapidly moved.

An approximate idea of the relative speeds of the drive and driven members may be obtained from a consideration of relative sizes of the parts for if the flange 10 of the drive member 8 has a diameter of twenty-four inches and the peripheral portion 15 of the boss 173 a diameter of twenty inches and the head 8 be rotated with a speed of say fifteen times per minute, the boss 13 will gyrate about two hundred and eighty times per minute.

While either form of the invention shown in the drawings will operate successfully the form shown in Figs. 1, 2 and 3 is to be preferred, since the recess 9 forms a convenient receptacle for lubricant maintaining the parts well lubricated at all times.

In the form of the invention shown in Figs. 1, 2 and 3 the direction of gyration is the same as the direction of rotation of the drive member, while in the form shown in Fig. 4 the direction of gyration of the driven member is the reverse of the direction of gyration of the drive member.

The supporting of the driven member upon universally mounted rods or hangers will permit a twisting or wabbling action of the sieve while being driven were it not for the presence of the connected levers 17 and 18 which coact to prevent any rotative movement of the sieve frame, while not in the least interfering with the revolving or gyrating movement thereof.

No claim is made in this application for the broader principles of the invention, since such claims are made in my application No. 627,834, filed May 17, 1911, for a sieve bolter, the present invention being an improvement upon the structure shown in the said application.

What is claimed is:—

1. In a machine for the purpose described, a drive element and a driven element, one surrounding the other, and the surrounding element having a greater internal diameter than the external diameter of the other element and both elements being provided with gear teeth arranged to mesh, one of said elements having a fixed axis of rotation and the other element being mounted to freely revolve with relation to the axis of rotation of the first named element in engagement with the latter by the action of centrifugal force and provided with means for holding it against rotation.

2. In a machine for the purpose described, a rotatable drive element having a circular wall and rotatable about a fixed axis, and a driven element having a circular wall adapted to engage the circular wall of the drive element under the action of centrifugal force and provided with means for holding it against rotation about its own axis, one element being in inclosing relation to the other element and of greater internal diameter than the external diameter of said other element and thereby determine the extent of free movement of the driven element, each element being provided with a circular series of gear teeth adapted to mesh with those of the other.

3. In a machine for the purpose described, a rotatable member having a circular portion and an adjacent circular series of gear teeth, a driven member having a circular portion and an adjacent series of gear teeth in operative relation to the like parts of the drive member, the drive and driven members being one in surrounding relation to the other and the surrounding member being of larger internal diameter than the external diameter of the other with the driven member free to move in a path determined by the difference in diameter of the two elements, and means for holding the driven member against bodily rotative movement.

4. In a machine for the purpose described, a drive element having an upright axis of rotation and provided with a laterally extended head having an internal chamber closed at the bottom opening upwardly when in operative position, said head being also provided within the chamber with an inwardly directed circular flange and a circular series of inwardly directed gear teeth, and a driven member having a circular portion entering the chamber in the drive member, said circular portion carrying a circular series of gear teeth adapted to mesh with the series of gear teeth on the drive member and with a peripheral portion adapted to engage the inwardly directed flange of the drive member, the drive member being provided with means whereby it may be rotated, and the driven member being free to engage the drive member under the action of centrifugal force and provided with means whereby it is held against bodily rotative movement while freely gyrating about the axis of rotation of the driven member.

5. In a machine for the purpose described, a rotatable drive member having a fixed axis of rotation, and a driven member having a free range of movement with relation to the axis of rotation of the drive member to move in a circular path, and means for preventing the driven member from bodily rotating about the axis of rotation of the drive member, the drive and driven members having respective series of gear teeth in meshing relation and the drive member constraining the driven member to move in a circular path by the action of centrifugal force holding said driven member in engagement with the drive member.

6. In a machine for the purpose described, means for causing a non-rotative circular movement of a driven member by a slower rotative movement of a drive member, comprising two members one in encircling relation to the other and each provided with a circular series of gear teeth adapted to mesh with those of the other, the encircling member having an internal diameter proportionate to the external diameter of the encircled member to determine the extent of circular movement imparted to the driven member, and said driven member being free to engage the drive member under the action of centrifugal force and provided with means for holding it against rotative movement about its own axis.

7. In a machine for the purpose described, a rotatable drive member and a driven member engaged and actuated by the drive member to gyrate with respect to the latter, the drive and driven members being one in surrounding relation to the other and of larger internal diameter than the external diameter of the other to determine the extent of gyratory movement of the driven member, both members being provided with gear teeth in meshing relation, and the driven member being free to engage the drive member under the action of centrifugal force and provided with means for holding it against bodily rotative movement.

8. In a machine for the purpose described, a rotatable drive member and a driven member engaged and actuated by the drive member to gyrate with respect to the latter, the engaging portions of both members being in part smooth and in part formed of gear teeth in meshing relation, and the drive and driven members being one in surrounding relation to the other and of larger internal diameter than the external diameter of the other to determine the amount of gyratory movement of the driven member and the latter being free to engage the drive member under the action of centrifugal force and provided with means for holding it against bodily rotative movement.

9. In a machine for the purpose described, a drive member having an active progressively moving portion formed of gear teeth, and a driven member having gear teeth actuated by the gear teeth of the drive member to cause said driven member to gyrate about the drive member by the progressive engagement of successive portions of the gear teeth of the two members, the said driven member being free to engage the drive member under the action of centrifugal force and having means for holding it against bodily rotative movements.

10. In a machine for the purpose described, a rotatable drive member provided with a continuous series of gear teeth directed toward the axis of rotation and a smooth portion adjacent the gear teeth in surrounding relation to the axis of rotation, and a driven member free to gyrate with reference to the driven member and having a continuous series of gear teeth adapted to mesh with those of the drive member, and a smooth portion adapted to engage the smooth portion of the drive member to determine the depth of meshing of the gear teeth, the driven member having the portion provided with gear teeth in entering relation to the portion of the drive member provided with gear teeth and that portion of the drive member receiving the driven member being shaped and positioned to constitute a receptacle for lubricant.

11. In a machine for the purpose described, a rotatable member, another member in encircling relation to and of larger internal diameter than and having a limited free movement with respect to the first member commensurate with the difference in diameters of the two members, the said first member imparting free gyratory movement to the second member by the action of centrifugal force, and means for holding the second member against rotative movement comprising connected members mounted for movement simultaneously in opposite directions and connected to spaced points of the driven member.

In testimony, that I claim the foregoing as my own, I have hereto affixed my signature in the presence of two witnesses.

GEORGE HALLIDAY.

Witnesses:
WILLIAM SCHEART, Jr.,
J. L. TULL.

---

Copies of this patent may be obtained for five cents each, by addressing the "Commissioner of Patents, Washington, D. C."